United States Patent [19]

Gardos et al.

[11] 4,376,710

[45] Mar. 15, 1983

[54] HIGH LOAD CARRYING POLYIMIDE LUBRICATIVE COMPOSITES

[75] Inventors: Michael N. Gardos, Palms; Arturo A. Castillo, La Puente, both of Calif.

[73] Assignee: Hughes Aircraft Company, Culver City, Calif.

[21] Appl. No.: 249,243

[22] Filed: Mar. 30, 1981

[51] Int. Cl.³ .............................................. C10M 5/20
[52] U.S. Cl. .................................. 252/12.4; 252/12.6; 252/12; 252/49.8
[58] Field of Search .......................... 252/12.4, 12, 49.8

[56] References Cited

U.S. PATENT DOCUMENTS

| | | | |
|---|---|---|---|
| 3,567,504 | 3/1971 | Hopkins et al. | 252/12.4 |
| 3,623,981 | 11/1971 | Gilbrow et al. | 252/12.4 |
| 3,781,205 | 12/1973 | Cairns et al. | 252/12.4 |
| 4,075,111 | 2/1978 | Bilow et al. | 252/12 |

Primary Examiner—Jacqueline V. Howard
Attorney, Agent, or Firm—A. W. Karambelas; W. H. MacAllister

[57] ABSTRACT

Solid self-lubricating composites comprising carbon or graphite fiber preforms reinforced with high temperature resins and self-lubricating pigments are disclosed which withstand very high loads at very high temperatures.

7 Claims, 2 Drawing Figures

HIGH LOAD CARRYING POLYIMIDE LUBRICATIVE COMPOSITES

The invention herein described was made in the course of, or under, a contract or subcontract thereunder with the United States Air Force.

TECHNICAL FIELD

This invention relates, generally, to the preparation of self-lubricating composites and, more particularly, to the preparation of solid composites which are capable of withstanding loads in excess of 4,000 psi at temperatures which exceed 500° F.

BACKGROUND OF THE INVENTION

1. Field of the Invention

This invention embodies the provision of a tailorable self-lubricating composite for use in the fabrication of bearings, bushings, and other structural components that are intended for use under dynamic loads which exceed 4,000 psi and operate at temperatures in excess of 500° F. These composites must have low wear rates, low coefficients of friction, high compressive strength, and high oxidative stability in air at temperatures which range from 500° F. to 600° F. and above.

2. Description of the Prior Art

There are numerous, commercially available, self-lubricating composites presently in existence. However, insofar as it is known, none of the commercially available prior art self-lubricating composites are capable of withstanding both high load (in excess of 4,000 psi) and high temperature (greater than 500° F.) operations for extended time periods.

The best known examples of commercially available prior art self-lubricating composites are embodied in the "Kinel" polymide based self-lubricating composites manufactured by Rhone Poulenc of Paris, France; the "Ryton" polyphenylene sulfide based self-lubricating composites manufactured by Phillips Petroleum Company or Bartlesville, Okla.; and the "Vespel" graphite filled polymide self-lubricating composite manufactured by Dupont Chemical Company of Wilmington, Delaware.

Concerning the present invention, the closest prior art, known to Applicants herein, is embodied in U.S. Pat. No. 4,075,111 for Heavy Metal Chalcogenide-Polyimide Lubricative Composites that are issued to Applicant Michael N. Gardos herein and Norman Bilow on Feb. 21, 1978. The "111" Bilow-Gardos patent teaches self-lubricating composites comprising cured acetylene-terminated polymide oligomers filled with molybdenum disulfide, or various other chalcogenides, such as tungsten disulfide, tungsten diselenide, and molybdenum diselenide, in concentrations up to 70% by weight. While the self-lubricating composites of the "111" patent exhibit high temperature stabilities, these composites are incapable of sustained operations at loads which exceed 4,000 psi.

There are many researchers striving to produce self-lubricating coposites which are capable of sustained load carrying capacities up to 172 mega pascals (MPa). References which illustrate this work include but are not limited to Perkins, C. W. "The Tribological Aspects of Carbon Fiber Reinforced Plastics", D. Mat. Report No. 173, Department of Trade and Industry, London, 1971; Giltrow, J. P., "A Synopsis of the Tribological Characteristics of Carbon Fiber Composites", Royal Aircraft Establishment Report No. 72092, May 1972; Giltrow, J. P., et al, "The Role of the Counterface in the Friction and Wear Carbon Fiber Reinforced Thermal Setting Resins", Wear, 16 359 (1970); and Brown, R. D., and Blackstone, W. R. "Evaluation of Graphite Fiber Reinforced Plastic Composites for Use in Unlubricated Sliding Bearings", ASTM Conference, Williamsburg, Virginia, March 1973.

While these prior art approaches taken by each of the above-identified researchers have proven generally satisfactory in some respects, their resultant composites have not been able to adequately withstand the high pressures and high temperatures to which they are subjected under certain high load conditions. As will become more apparent hereinafter, it is the solution to this latter problem to which the present invention is directed.

SUMMARY

The general purpose of this invention is to provide a tailorable self-lubricating solid composite for use as bearings, bushings, bearing-retainers, and other structural lubricative elements under operational conditions which may exceed 172 MPa and temperatures of 500° F. In accomplishing this purpose while avoiding most, if not all, of the disadvantages of the prior art, we have invented a tailorable high load capacity, high temperature self-lubricating solid composite by combining a multi-dimensional weave preform, prepared from carbon fibers, graphite fibers, or a combination thereof which are subsequently modified by the addition of an adjuvant, with a high temperature resin that is filled with lubricative pigments that are oxidatively stable in air up to 1,000° F.

Self-lubricating composites prepared in accordance with our invention may be tailored through the use of a characteristic wear equation to provide lubricative surfaces under a broad spectrum of conditions wherein the load factors range from ambient pressures to 25,000 psi and the operating temperatures ranges from room ambient temperature to as high as 600° F.

It is, therefore, one purpose of this invention to provide a self-lubricating solid composite for use as a lubricative element under high load and high temperature conditions.

A further purpose of this invention is to provide tailorable self-lubricating composites for use in the fabrication of bearings, bearing-bushings, bearing retainers, and other structural lubricative elements.

A still further purpose of this invention is to provide a process for preparing self-lubricating solid composites to be used as bearings, bearing bushings, bearing retainers and other structural lubricative elements.

That we have accomplished the above-stated purposes while avoiding the disadvantages of the prior art, and retaining most, if not all, of the advantages of said art, will be apparent upon reference to the following brief description of the drawings and detailed description of the invention.

DETAILED DESCRIPTION OF THE INVENTION

Figure 1:
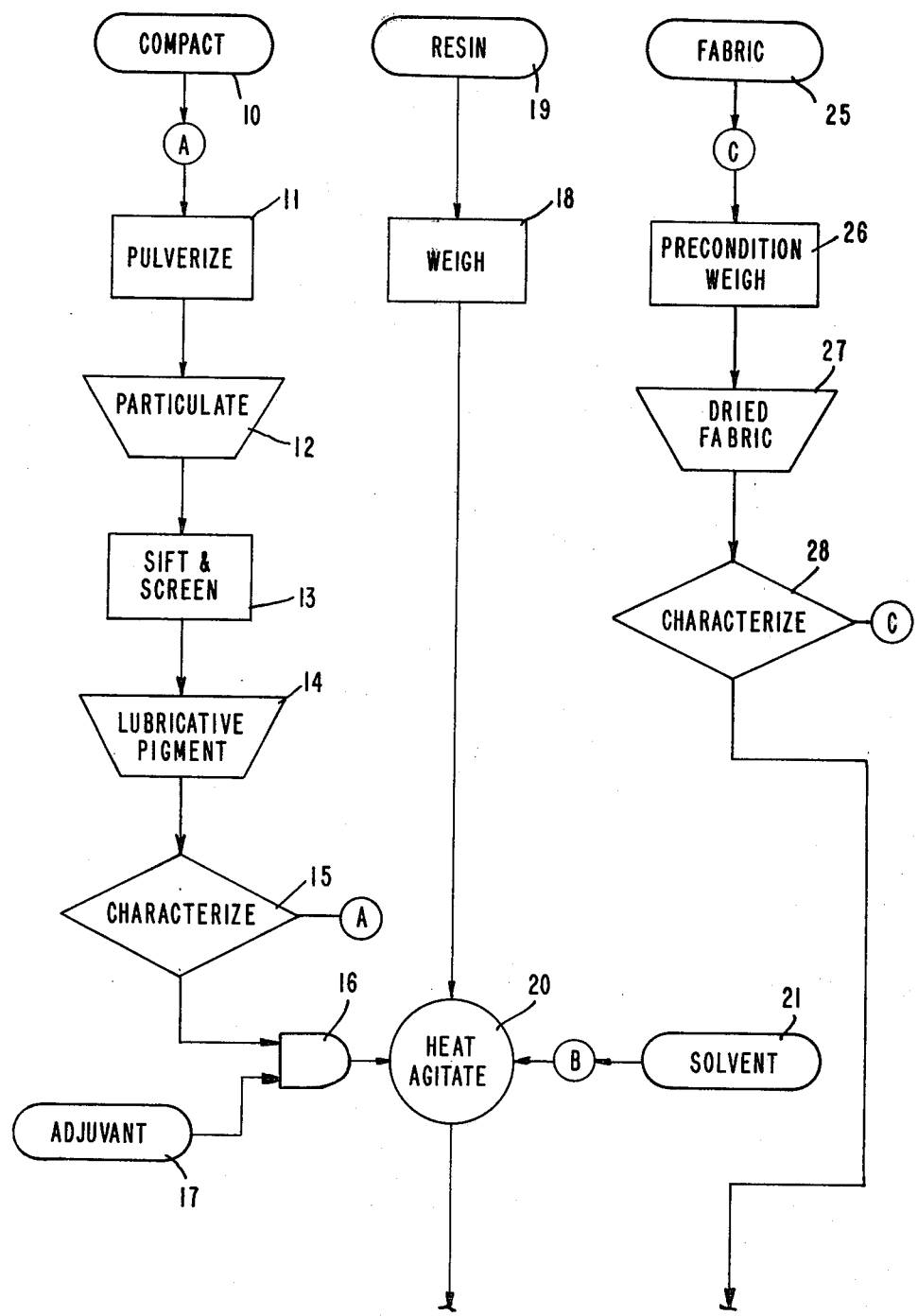
FIG. 1 is a schematic flow chart which shows the process of preparing a self-lubricating composite from a woven preform.

We have discovered that tailorable high load capacity, high temperature lubricative composites can be prepared from a combination of: (1) multi-dimensional weave preforms, (2) commercially available self-lubricating solid pigments, (3) high temperature acetylene terminated polyimide oligomers and (4) trace quantities of select adjuvants our composites so fabricated exhibit lubricative characteristics far superior to prior art lubricative composites under comparable load applications.

Our composites are tailorable in that they can be adapted for use in a wide range of environmental conditions following the teachings of our design parameters to thereby provide those component combinations which yield optimum results for any particular application requiring a self-lubricating composite material. The term "preform", as used herein, is intended to refer to a woven fiber fabric or cloth which has a predetermined weave geometry. Woven preforms are commercially available as two directional (2-D), three directional (3-D), or as multi-directional (4-D, 5-D, 7-D . . . 11-D) fabrics and can be prepared from numerous materials such as quartz, fiberglass, zirconia, boron, boron nitride, Silicon Carbide, Carbon, Graphite, High Modulus Fibers, tungsten, stainless steel, metal-graphite, multi-yarns and ceramic fibers.

We prefer to utilize loosely woven preforms of carbon, graphite or a combination thereof. High modulus graphite fibers (Type I) and low modulus, amorphous carbon fibers (Type II) woven into 3-D preforms were exceptionally suitable for several select combinations and applications.

We have ascertained that the use of a Type I or Type II preform is facilitated by the addition of a trace (less than 2%) amount of an adjuvant which assumes the role of water vapor water inherently found on the surface of carbon and on graphite fibers. Desorption of water leads to drying and abrasive action of the fibers of elevated temperatures and the addition of the adjuvant strongly mitigates this undesirable effect. While many compounds have been utilized as adjuvants, for our purposes, only diammonium hydrogen phosphate [$(NH_4)_2HPO_4$] appears to yield the desired results.

For the purpose of this invention, we define self-lubricating solid pigments as lamellar solids having a unit cell C/A ratio of between 1.95 and 2.0. These materials are generally formed from pulverized compacts comprising elements found in Groups V and VI (Rows 4-5) of the periodic chart and include, but are not limited to, for example, the sulfides, oxides, and selenides of Tungsten, Indium, Molydenum, Gallium, and Antimony.

The most suitable lubricative pigment for our purposes was obtained by pulverizing a $Ga/In/WSe_2$ compact, known as the Westinghouse Compact, into particles whose diameters ranged essentially from 5 to 10 $\mu m$. Other compacts of $Mo/Nb/Cu/MoS_2$ (Hard Molalloy) and $MoS_2/Ta_2$ (Soft Molalloy) may be used for select applications where the performance parameters are less demanding.

The final element of our composite is the resin which acts as a binder for the system. For this purpose we have chosen to utilize polyimide oligomers prepared in accordance with the teachings of U.S. Pat. Nos. 3,845,018 (Thermid 600) and 3,879,349 issued to Norman Bilow et al. These oligomers are acetylene terminated polyimides which undergo additional polymerization without the evolution of void forming gaseous by-products. They are exceptionally stable at high temperatures and polymerized into exceptionally strong polymeric materials.

We incorporate, by reference, the teachings of U.S. Pat. Nos. 3,845,018 and 3,879,349 herein for the purpose of enabling others to make and utilize our self-lubricating composites with the resins disclosed therein.

While our studies have shown that acetylene terminated polyimide oligomers are preferred for the invention, other high temperatures, stable, structurally strong and chemically inert resins may be employed and are not excluded from consideration or use in any particular combination which follows the teachings as set forth herein. Included as possible resins are any improved versions of Thermid 600, the second generation NASA Lewis PMR polyimide oligomers which cure via addition reactions into relatively stable high temperature polymers or resins.

Our lubricant composites generally are comprised of a loosely woven preform of selected carbon or graphitic fibers stabilized with up to two percent by weight of $NH_2HPO_4$, filled with from 20 to 30 percent lubricating pigment and bound with from 30–45% resin.

The physical properties of our solid lubricant composites will vary with the selection of the preform and with variations in the resin/additive content of the composites. For example, as shown in the following table, materials having compressive strengths which vary from a low of 154.44 MPa (where 1 MPa=145.03683 1 bf/in$^2$) to a high of 401.97 MPa at 25° C. and densities ranging from a low of 1.44 to a high of 1.64 grams per centimeter cube (g/cm$^3$) were obtained by varying weave form compositions and the resin/additive content for a fixed resin, adjuvant and lubricative pigment.

TABLE 1

PHYSICAL PROPERTIES OF REINFORCED THERMID 600/Ga/In/WSe$_2$ COMPACT/(NH$_4$)$_2$HPO$_4$ COMPOSITES

| Physical Properties | | HMS Weave No. 1 | HMS Weave No. 2 | VYB 70½ Weave |
|---|---|---|---|---|
| Compressive Strength[1], MPa | 25° C. | (3) | 169.61 | 401.97 |
| | | | 154.44 | 381.97 |
| 1 × 10$^3$lbf/in$^2$ = 6.8948 MPa | 316° C.[2] | 106.18 | 131.00 | 261.31 |
| | | 104.80 | 99.29 | 265.45 |
| Resin/Additives | Before Molding | 60.0 | 60.0 | 60.0 |
| Content (% by wt.) | After Molding | 54.1 | 59.1 | 53.5 |
| Density (g/cm$^3$) | | 1.58 | 1.64 | 1.46 |
| Barcol Hardness | | 38 | 42 | 67 |

[1]Force applied parallel to the direction of molding pressure.
[2]15 minute conditioning of specimen/test assembly at 316° C. (600° F.) in the Instron environmental chamber (before each test).
[3]Tests not performed.

The compressive strength, hardness and density of the composites bear directly upon the average wear rates under specified conditions and other parameters such as average friction values. For example, as shown in Table 2, wear rates of from $1.3 \times 10^{-8}$ to $3.2 \times 10^{-8}$ meters per sec (m. sec$^{-1}$) were exhibited at 316° C. under 11.03 MPa by solid lubricative composites prepared in accordance with our invention utilizing two different preforms.

TABLE 2

AVERAGE WEAR RATES OF AS-MOLDED 3D CARBON AND GRAPHITE WEAVE REINFORCED THERMID 600/Ga/In/WSe$_2$ COMPACT/(NH$_4$)$_2$HPO$_4$ COMPOSITES AT VARIOUS TEMPERATURES AND PRESSURE-UNIDIRECTIONAL VELOCITY CONDITIONS

| | Wear Rate, m · sec$^{-1}$ | | | | |
|---|---|---|---|---|---|
| | No Heat Applied | 316° C. (600° F.) | | | |
| Preform Type of Composites | 6.07 MPa 0.76 m · sec$^{-1}$ | 2.76 MPa 0.51 m · sec$^{-1}$ | 6.07 MPa 0.76 m · sec$^{-1}$ | 11.03 MPa 0.76 m · sec$^{-1}$ | 27.58 MPa 0.76 m · sec$^{-1}$ |
| VYB 70½ Weave | $9.9 \times 10^{-10}$ | $3.3 \times 10^{-9}$ | $9.9 \times 10^{-9}$ | $1.3 \times 10^{-8}$ | $2.5 \times 10^{-8}$ |
| HMS Weave No. 2 | $1.1 \times 10^{-8}$ | $1.8 \times 10^{-8}$ | $2.6 \times 10^{-8}$ | $3.2 \times 10^{-8}$ | —(1) |

(1)Rubshoe crushed as soon as load was applied.

The data shown in Table 2 and in Table 3 below were obtained from tests of a 3-D carbon (VYB 70-½ Weave) and a 3-D Graphite (HMS Weave No. -2) preform reinforced with an acetylene terminated polyimide oligomer prepared in accordance with the teachings of U.S. Pat. No. 3,845,018 where: R is phenylene oxyphenylene oxyphenylene; R' is phenylene; R" is phenylene-CO-phenylene; and n is 1. These composites exhibited exceptional kinetic friction coefficients under high loads at 316° C.

TABLE 3

AVERAGE FRICTION OF AS-MOLDED 3D CARBON AND GRAPHITE WEAVE REINFORCED THERMID 600/Ga/In/WSe$_2$ COMPACT/(NH$_4$)$_2$HPO$_2$ COMPOSITES AT VARIOUS TEMPERATURES AND PRESSURE-UNIDIRECTIONAL VELOCITY CONDITIONS

| | Coefficient of Kinetic Friction at the Beginning (B), Middle (M) and End (E) of Friction Tests | | | | | | | | | | | | | | |
|---|---|---|---|---|---|---|---|---|---|---|---|---|---|---|---|
| | No Heat Applied | | | 316° C. (600° F.) | | | | | | | | | | | |
| | 6.07 MPa 0.76 m · sec$^{-1}$ | | | 2.76 MPa 0.76 m · sec$^{-1}$ | | | 6.07 MPa 0.76 m · sec$^{-1}$ | | | 11.03 0.76 m · sec$^{-1}$ | | | 27.58 MPa 0.76 m · sec$^{-1}$ | | |
| Preform Type of Composites | B | M | E | B | M | E | B | M | E | B | M | E | B | M | E |
| VYB 70½ Weave | 0.22 | 0.11 | 0.11 | 0.16 | 0.15 | 0.15 | 0.11 | 0.07 | 0.04 | 0.08 | 0.05 | 0.04 | 0.04 | 0.04 | 0.04 |
| HMS Weave No. 2 | 0.12 | 0.11 | 0.13 | 0.11 | 0.14 | 0.12 | 0.21 | 0.16 | 0.18 | 0.18 | 0.14 | 0.12 | —(1) | —(1) | —(1) |

(1)Rubshoe crushed as soon as load was applied.

It can be seen, from the data shown in Tables 2 and 3 above and from the data shown in Tables 4, 5, and 6 below, that self-lubricating composites prepared in accordance with the invention are very reproducible. This aspect of the invention is significant in that it allows one to predict the wear life of his composite under realistic, bushing-like applications.

TABLE 4

WEAR AND FRICTION DATA FOR HIGH LOAD (137.9 MPa = 20,000 PSI), VARIABLE OSCILLATING SPEED TESTS (TEMP. = 316° C. = 600° F.) ON THE VYB 70½ WEAVE REINFORCED THERMID 600/Ga/In/WSe$_2$ COMPACT/(NH$_4$)$_2$HPO$_4$ COMPOSITE

| Test No. 5 (V = 2.2 × 10$^{-3}$ m · sec$^{-1}$) | | | Test No. 6 (V = 2.2 × 10$^{-3}$) | | | Test No. 7 (V = 8.8 × 10$^{-3}$ m · sec$^{-1}$) | | |
|---|---|---|---|---|---|---|---|---|
| t (hrs) | W (m) | f$_k$ | t (hrs) | W (m) | f$_k$ | t (hrs) | W (m) | f$_k$ |
| 0.18 | $1.8 \times 10^{-5}$ | 0.40 | 1.67 | $6.9 \times 10^{-5}$ | 0.20 | 0.42 | $1.3 \times 10^{-4}$ | 0.19 |
| 1.67 | $4.6 \times 10^{-5}$ | 0.30 | 5.0 | $1.2 \times 10^{-4}$ | 0.21 | 1.25 | $1.8 \times 10^{-4}$ | 0.18 |
| 5.00 | $7.4 \times 10^{-5}$ | 0.17 | 11.67 | $1.4 \times 10^{-4}$ | 0.16 | 2.92 | $2.1 \times 10^{-4}$ | 0.14 |
| 6.67 | $1.0 \times 10^{-4}$ | 0.18 | 33.33 | $1.9 \times 10^{-4}$ | 0.11 | 8.33 | $2.4 \times 10^{-4}$ | 0.07 |
| 11.67 | $1.1 \times 10^{-4}$ | 0.15 | | | | 12.50 | $2.8 \times 10^{-4}$ | 0.05 |
| 13.33 | $1.3 \times 10^{-4}$ | 0.18 | | | | 16.67 | $2.8 \times 10^{-4}$ | 0.06 |
| 33.33 | $1.5 \times 10^{-4}$ | 0.10 | | | | | | |

| Test No. 8 (V = 8.8 × 10$^{-3}$ m · sec$^{-1}$) | | | Test No. 9 (V = 4.4 × 10$^{-3}$ m · sec$^{-1}$) | | | Test No. 10 (V = 4.4 × 10$^{-3}$ m · sec$^{-1}$) | | |
|---|---|---|---|---|---|---|---|---|
| t (hrs) | W (m) | f$_k$ | t (hrs) | W (m) | f$_k$ | t (hrs) | W (m) | f$_k$ |
| $4.1 \times 10^{-3}$ | $2.8 \times 10^{-4}$ | 0.30 | 0.833 | $1.2 \times 10^{-4}$ | 0.18 | 0.833 | $2.4 \times 10^{-4}$ | 0.26 |
| $4.1 \times 10^{-2}$ | $3.8 \times 10^{-4}$ | 0.38 | 5.83 | $1.3 \times 10^{-4}$ | 0.14 | 1.66 | $2.5 \times 10^{-4}$ | 0.22 |
| $1.25 \times 10^{-1}$ | $4.4 \times 10^{-4}$ | 0.37 | 10.0 | $1.7 \times 10^{-4}$ | 0.09 | | | |
| 0.25 | $4.7 \times 10^{-4}$ | 0.30 | 16.67 | $1.7 \times 10^{-4}$ | 0.15 | | | |
| 0.42 | $4.8 \times 10^{-4}$ | 0.27 | 18.33 | $2.2 \times 10^{-4}$ | 0.16 | | | |
| | | | 24.50 | $2.7 \times 10^{-4}$ | 0.13 | | | |
| | | | 33.33 | $2.7 \times 10^{-4}$ | 0.07 | | | |

TABLE 5

WEAR AND FRICTION DATA FOR HIGH LOAD (172 MPa = 25,000 PSI) VARIABLE OSCILLATING SPEED TESTS (TEMP. = 316° C. = 600° F.) ON THE VYB 70½ WEAVE REINFORCED THERMID 600/Ga/In/WSe$_2$ COMPACT/(NH$_4$)$_2$HPO$_4$ COMPOSITE

| Test No. 3 | | | | Test No. 4 | | | |
|---|---|---|---|---|---|---|---|
| t (hrs) | V (m · sec$^{-1}$) | W (m) | $f_k$ | t (hrs) | V (m · sec$^{-1}$) | W (m) | $f_k$ |
| $6.6 \times 10^{-2}$ | $2.2 \times 10^{-3}$ | $1.2 \times 10^{-4}$ | 0.17 | $3.3 \times 10^{-2}$ | $2.2 \times 10^{-3}$ | $1.7 \times 10^{-5}$ | 0.15 |
| $1.7 \times 10^{-1}$ | $2.2 \times 10^{-3}$ | $1.3 \times 10^{-4(1)}$ | 0.17 | $6.6 \times 10^{-2}$ | $2.2 \times 10^{-3}$ | $5.3 \times 10^{-5}$ | 0.18 |
| $3.33 \times 10^{-1}$ | $2.2 \times 10^{-3}$ | $1.3 \times 10^{-4}$ | 0.17 | $9.9 \times 10^{-2}$ | $2.2 \times 10^{-3}$ | $8.6 \times 10^{-5}$ | 0.25 |
| $6.66 \times 10^{-1}$ | $2.2 \times 10^{-3}$ | $1.3 \times 10^{-4}$ | 0.16 | $2.0 \times 10^{-1}$ | $1.6 \times 10^{-4}$ | $1.6 \times 10^{-4}$ | 0.25 |
| 1.0 | $4.4 \times 10^{-3}$ | $1.3 \times 10^{-4}$ | 0.14 | $4.3 \times 10^{-1}$ | $2.2 \times 10^{-3}$ | $2.0 \times 10^{-4}$ | 0.25 |
| 1.25 | $6.6 \times 10^{-3}$ | $1.3 \times 10^{-4}$ | 0.13 | $6.0 \times 10^{-1}$ | $2.2 \times 10^{-3}$ | $2.3 \times 10^{-4}$ | 0.25 |
| 1.45 | $8.8 \times 10^{-3}$ | $1.3 \times 10^{-4}$ | 0.13 | $7.0 \times 10^{-1}$ | $4.4 \times 10^{-3}$ | $2.4 \times 10^{-4}$ | 0.24 |
| | | | | $8.0 \times 10^{-1}$ | $6.6 \times 10^{-3}$ | $2.5 \times 10^{-4(1)}$ | 0.25 |
| | | | | $9.0 \times 10^{-1}$ | $8.8 \times 10^{-3}$ | $2.5 \times 10^{-4}$ | 0.19 |

(1)Start of an apparent "no wear" situation, probably caused by some composite swelling.

TABLE 6

OSCILLATORY WEAR EQUATION TEST MATRIX OF VYB 70½ REINFORCED THERMID 600/Ga/In/WSe$_2$ COMPACT/(NH$_4$)$_2$HPO$_4$ COMPOSITE (316° C. = 600° F. Test Temperature)
Min. Wear W1 = 1.00000E-7    No. of Data Points is 65

| P1 (psi) | V (ft/min) | T (hr) | W (Grams) | P1 (psi) | V (ft/min) | T (hr) | W (Grams) |
|---|---|---|---|---|---|---|---|
| 1000 | 24 | 1 | 0.003 | 1000 | 96 | 2.5 | 0.1035 |
| 1000 | 24 | 3 | 1.15000E-2 | 2000 | 24 | 1 | 0.0185 |
| 1000 | 24 | 4 | 0.02 | 2000 | 24 | 1.5 | 0.006 |
| 1000 | 24 | 1 | 0.0075 | 2000 | 24 | 7 | 2.45000E-2 |
| 1000 | 24 | 3 | 0.0611 | 2000 | 24 | 3 | 0.0005 |
| 1000 | 24 | 4 | 1.6700E-2 | 2000 | 24 | 1 | 0.0165 |
| 1000 | 48 | 1 | 0.0031 | 2000 | 24 | 7 | 0.206 |
| 1000 | 48 | 3 | 0.015 | 2000 | 24 | 3 | 0.0125 |
| 1000 | 48 | 1 | 2.10000E-2 | 2000 | 48 | 1 | 0.008 |
| 1000 | 48 | 3 | 1.01100E-2 | 2000 | 48 | 3 | 0.0167 |
| 1000 | 96 | 1 | 0.0501 | 2000 | 48 | 1.1 | 0.0125 |
| 1000 | 96 | 3 | 0.0464 | 2000 | 48 | 1 | 5.14000E-2 |
| 1000 | 96 | 2.5 | 0.0018 | 2000 | 48 | 3 | 0.1036 |
| 1000 | 96 | 1 | 0.032 | 2000 | 48 | 1.1 | 1.62000E-2 |
| 1000 | 96 | 3 | 0.0355 | 2000 | 96 | 0.6666 | 0.0145 |
| 2000 | 96 | 1 | 0.0215 | 4000 | 24 | 3 | 0.0486 |
| 2000 | 96 | 3 | 0.016 | 4000 | 24 | 0.5 | 0.0005 |
| 2000 | 96 | 0.6666 | 0.0069 | 4000 | 24 | 1 | 0.0488 |
| 2000 | 96 | 1 | 0.0475 | 4000 | 24 | 3 | 0.0889 |
| 2000 | 96 | 3 | 8.44000E-2 | 4000 | 24 | 0.5 | 4.4000E-3 |
| 3000 | 24 | 1 | 0.0005 | 4000 | 24 | 1 | 0.0135 |
| 3000 | 24 | 2 | 0.0008 | 4000 | 48 | 0.6 | 0.001 |
| 3000 | 24 | 1 | 0.006 | 4000 | 48 | 1 | 0.0443 |
| 3000 | 24 | 2 | 0.0285 | 4000 | 48 | 3 | 0.0176 |
| 3000 | 24 | 3 | 2.30000E-2 | 4000 | 48 | 1 | 3.90000E-2 |
| 3000 | 48 | 1 | 0.0008 | 4000 | 48 | 3 | 0.0839 |
| 3000 | 48 | 2 | 0.016 | 4000 | 96 | 0.45 | 0.0119 |
| 3000 | 48 | 3 | 2.05000E-2 | 4000 | 96 | 0.1 | 0.0001 |
| 3000 | 48 | 1 | 0.0175 | 4000 | 96 | 0.8 | 4.90000E-2 |
| 3000 | 48 | 2 | 0.0661 | 4000 | 96 | 0.9 | 0.0611 |
| 3000 | 48 | 3 | 0.0059 | 4000 | 96 | 0.8 | 7.70000E-2 |
| 3000 | 96 | 0.6 | 0.017 | 4000 | 96 | 0.9 | 0.0854 |
| 3000 | 96 | 0.6 | 0.038 | | | | |

BO = 12.4264
W = K*(P1**B1)*V**B2)*(T**B3)
K = 3.86963E-6
B1 = 0.500913    B2 = 1.04317    B3 = 1.14765
S.D. = 0.32709    S.D. = 0.293695    S.D. = 0.238264
Error in Wear = 612.187%

Data, such as that shown in Table 6, may be used to compute applicable wear equations using known regression analysis techniques. For example, from Table 6 we may compute the radial wear expected when a composite comprised of a VYB 70-½ Weave preform stabilized with 2% (NH$_4$)$_2$ HPO$_4$ and reinforced with Thermid 600 filled with Ga/In/WSe$_2$ particles, using the following equation:

$$R = (K/A \times P)P^{0.5}VT \quad (1)$$

Where:
R = radial wear (in)
K = wear coefficient
A = contact area (in$^2$)
P = composite density lbm. in$^{-3}$
P = unit load, lbm.
V = average oscillatory velocity (ft. min$^{-1}$)
T = duration of sliding (hours)

As shown above, we have prepared self-lubricating composites of soft Type I carbon fibers and hard, inherently abrasive Type II graphitic fibers. The highest load carrying capacity is provided by the inherently more abrasive Type II fibers because of their lower modulus, and greater flexibility in 3-D orthogonal weave fabrics.

The best results are obtained when the majority of the fiber lay is in the plane of sliding, i.e., normal to the applied load. We also prefer to utilize carbon/graphite tows having the smallest number of individual fiber strands commercially feasible. Generally we select fabrics having a fiber-to-fiber spacing which is commercially attainable in the art of woven cloth. It is desirable, but not critical, that the fabric have a spacing of about 0.05 inch. Relative fiber volumes on the order of 35–45% are preferred.

Figure 1A:
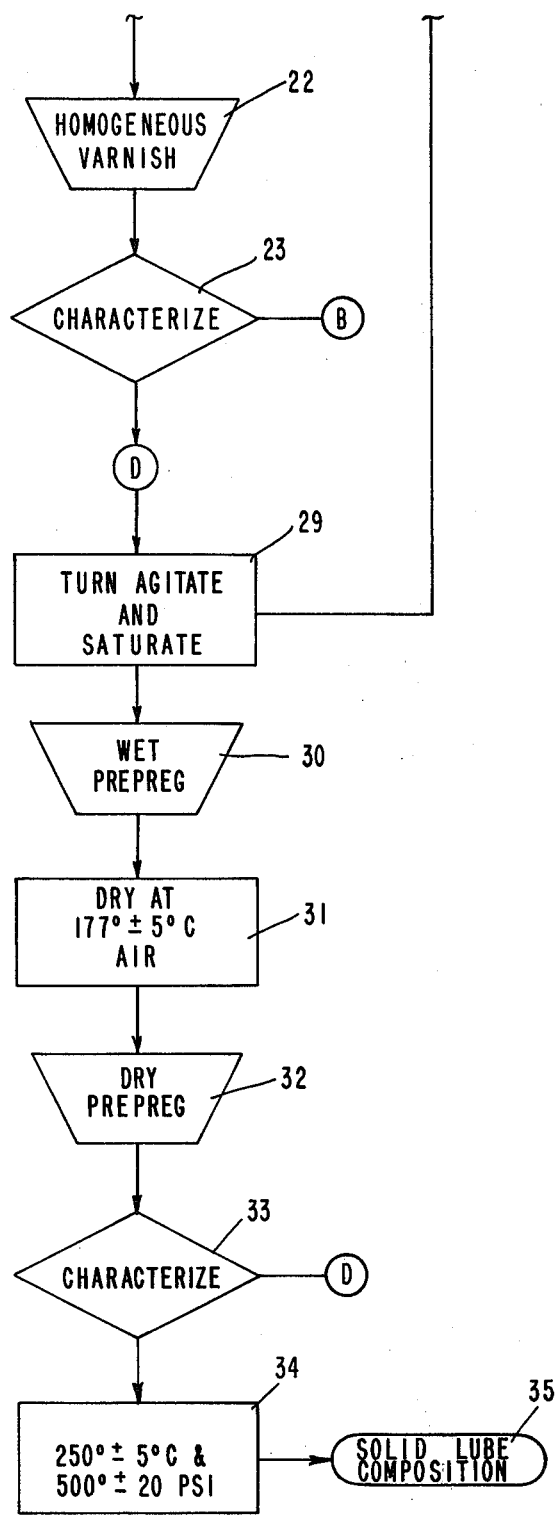

Turning to the figures, one proceeds to make composites in accordance with the invention by assembling the major components. The flow chart of FIGS. 1 and 1a includes the various stations of the present process which are identified by legend understood by those skilled in the art, and which stations include reference numerals used below in correlating the following individual process steps with these figures. This legend is intended to refer only functionally to these various individual process steps and does not in any way limit such steps or stations to any particular apparatus or hardware for carrying out such steps. Obviously, the selection of the particular equipment for performing these steps may be made by those skilled in the art. Our preferred compacts at station 10 may be obtained from Westinghouse Corporation and contain Ga:In:WSe$_2$ in a 8:2:90 molar ratio. The materials are pulverized at station 11 in a colloidal mill to produce a particulate material at station 12 that is subsequently sifted and screened at station 13 to yield a lubricative pigment powder at station 14 having the following particle size distribution as determined by particle size analyses performed at station 15.

TABLE 7

| Characteristics of Lubricative Pigments | |
|---|---|
| Particle Size Range (μm) | Percentage Distribution |
| 5–10 | 99.2 |
| 10–25 | 0.7 |
| 25–50 | 0.1 |
| 50–100 | Trace |

If the resultant powder is not acceptable upon characterization, the pulverization process is respected as indicated by the letter "A" on the flow chart.

Preselected amounts of the pigment particles are then added at station 16, along with an adjuvant from station 17, in an amount not to exceed 2%, to a selected amount from station 18 of resin (oligomer) from station 19 in a mixer at station 20 and dissolved in a low volatile solvent from station 21 by the application of heat and agitation to form a hot homogeneous varnish dispersion at station 22. The dispersion is monitored at station 23 for viscosity and composition. If necessary, additional solvent from station 21 may be added as shown in steps "B" on the flow diagram.

When Thermid 600 is utilized as the resin, n-methyl pyrrolidone (NMP) heated to 177° C. appears to be a preferred solvent. However, other solvents such as dimethylformamid (DMF), meta cresol, cyclohexane, 1-formylpipridine, dimethyl acid amide, and other N-alkyl substituted amides are also suitable.

A selected preform from station 25 is preconditioned at station 26 to remove excess moisture by heating at 250° F. in a vacuum oven for 2 hours. The dried fabric of station 27 is then allowed to cool, it is weighed at station 28 and subsequently placed in a tray at station 29 where it is thoroughly soaked in the homogeneous varnish dispersion from station 22 to form a wet saturated prepreg at station 30.

After soaking, the wet prepreg is placed in a cold-trapped vacuum oven at station 31 preheated at 125°±0.5° C. and vacuum baked at that temperature for 8±0.5 hours to form a dry prepreg at station 32. It is then tested at station 33 for volatile content and rebaked if the volatile content exceeds 3% or resaturated as necessary in accordance with step 0 of the flow diagram.

Typical weight percentages of composite constituents, prepared with planar 3-D Type I (HMS) and Type II (VYB 70-½) preforms are presented in the following table.

TABLE 8

| COMPOSITION OF SIMPLE, ORTHOGONAL, THREE DIMENSIONAL (3D) GRAPHITE AND CARBON WEAVE PREFORM REINFORCED COMPOSITES BEFORE MOLDING | | | | |
|---|---|---|---|---|
| | Percent by Weight | Weight of Constituents in Composite Prepregs Reinforced with the 3D Weaves Below (grams) | | |
| Constituent | | HMS Weave No. 1 | HMS Weave No. 2 | VYB 701½ Weave |
| Preform | 40 | 120.0 | 103.0 | 117.0 |
| Thermid 600 | 45 | 135.0 | 116.0 | 131.0 |
| Ga/In/Wse$_2$ Compact | 13 | 39.0 | 27.0 | 38.0 |
| (NH$_4$)$_2$HPO$_4$ | 2 | 6.0 | 5.0 | 6.0 |
| NMP (solvent | not applicable | 600.0 | 600.0 | 600.0 |

After drying, the prepreg from station 32 is placed into a steel mold at station 34 (designed for a given part geometry), preheated to 250°±5° C., and molded at 3.45±0.5 MPa in a similarly heated laboratory press. The pressure is applied slowly to prevent excess resin flow out of the preimpregnated preform, yet fast enough to take the gel times of the resin into account for obtaining void-free, molded blanks.

Final cure is accomplished by leaving the preform in the heat press under load for 2±0.5 hours which provides a molded self-lubricative composite at station 35. The entire molding assembly is allowed to cool below 100° C. before removing the molded composite form.

Another way of preparing the instant invention is to use specially designed steel molds, placed in a heated press, in conjunction with high thermal expansion silicone rubber cores or pressure inserts.

Still another way of preparing the instant invention is to utilize shape-retaining metal fixtures containing heating elements of such fixtures heatable by radio-frequency (RF) methods, placed in high pressure autoclaves for hot isostatic pressing of the prepregs.

Post cures may be accomplished, if necessary, by subjecting the cured composite, in its molded form, to the following post cure schedule.
1. Room Temperature to 232° C. (450° F.) in 2 hours and hold 2 hours
2. 232° C. (450° F.) to 316° C. (600° F.) in 2 hours and hold 4 hours
3. 316° C. (600° F.) to 371° C. (700° F.) in 2 hours and hold 8 hours
4. 371° C. (700° F.) to room temperature in 4 hours The postcured composite form is reweighed and the weight loss, resin/additive content and density are calculated.

The postcured composite form is machined to final dimensions, using carbide and diamond tools, at high machining speeds and slow feed rates.

Salient features of this invention may be summarized as follows:
* 3D and other multidirectional weaves of carbon-graphite fibers are ideal reinforcement for Thermid 600-based self-lubricating composites, provided they are crystallographically stabilized for a given use temperature. First and foremost, this reinforcement provides a very high strength producing, structurally well-defined, commercially preparable, multidirectional skeleton for Thermid 600. Second, carbon/graphite is a lubricating material in its Type I form only until the moisture is not thermally desorbed. Both the soft and the abrasive versions of the Type I and the inherently abrasive Type II fibers can be made non-abrasive, by the teachings of the instant invention, when the reinforcement is exposed to intimate sliding contact with the mating (metallic) bearing surface by the normal wear process, at elevated temperatures;
* The highest load carrying capacity is provided by the inherently more abrasive Type II fibers, due to its lower modulus, greater flexibility and the resulting reduced breakage during molding and due to its less brittle nature while under sliding at high loads, as compared to the more fragmentation prone Type I (graphitic) fibers. The load-carrying capacity especially at elevated temperatures, as provided by multidirectional reinforcing weaves of Type I fibers, therefore, can produce ultimate compressive strength values at 316° C. (600° F.) of only one-half to two-thirds of the values provided by the Type II weaves, regardless of the complexity (i.e., 5D, 7D) of the weaves involved;
* Contrary to current belief, Type II fibers can be made tribologically useful (i.e., non-abrasive) even against relatively soft mating metal surfaces (e.g., the high temperature, nickel-chromium alloy Rene 41 at 316° C.=600° F., $R_c$ hardness—40) by the use of specially selected solid lubricant additives. The mitigation of carbon fiber abrasiveness must be affected by the ability of the solid lubricant pigment to induce and propagate the rapid formation of a composite transfer film onto the mating metal surface. This film then protects the metal surface from the abrasive fibers and at the same time reduces carbon fiber wear;
* Formation of the transfer film is enhanced by interfacial enrichment of the lubricant pigment additive(s) on the composite sliding surfaces. Depending on the tribochemical (i.e., tribooxidative) stability of these additives, the friction and the wear rate can vary drastically from poor to excellent. The additive must, therefore, be capable not only to form films, but to remain physico-chemically unchanged, thereby continually providing low friction and wear, until the normal wear process removes it and the resin portion of the transfer film from the sliding surface.

After removal, fresh portions of the additive are continually exposed from the plastic matrix, lending themselves to the propagation of film formation. This preferential interfacial enrichment also indicates the desirability of artificial enrichment of the composite/metal sliding interface with the additives dispersed within the composite.

Thin film deposition techniques, such as sputtering the additive mixtures on the mating metal and/or the polymeric composite surface, or enriching the surface by final soaking a new-dimensional composite part in a lubricative additive-rich varnish solution, lend themselves readily for this role;
* 3D orthogonal Type II (amorphous, abrasive carbon) fiber weave reinforced Thermid 600 composites can perform in an outstanding manner where the majority of the fiber layer is in the plane of sliding i.e., normal to the applied load. This degree of satisfactory performance depends a great deal on the selection of the additives described above, yet the highest compressive strength is achieved automatically in that fiber lay configuration. Note that this fiber orientation is considered by many to be the most undesirable with respect to tribological performance;
* The powdered Ga/In/WSe$_2$ compact and the reagent grade $(NH_4)_2HPO_4$ was found to be an ideal solid lubricant additive/carbon-graphite fiber adjuvant combination. The Ga/In/Wse$_2$ compact does have both the thermal oxidative stability (up to 1000° F.) and the film forming capacity leading to low friction and wear. It also shows great affinity to the Thermid 600 resin, resulting in excellent adhesion at the compact particle/resin interface. About 2 weight percent of $(NH_4)_2HPO_4$ is extremely effective in reducing both the friction and the wear rate of carbon-graphite fiber composites.

The tendency of this adjuvant to decompose and generate a liquid product (note that $(NH_4)$—$_2HPO_4$ has no melting point; it decomposes at 155° C. (311° F.), below the top operating temperature of the composites of the instant invention), which can comprise an oxidation preventive coating, is probably one reason why $(NH_4)_2HPO_4$ is one of the most effective fire retardant chemicals now used for (a) combating forest fires and (b) reducing the flammability of polyurethanes. It has been suggested, after the fact of finding $(NH_4)_2HPO_4$ effective in the instant invention (Gardos, M. N., personal communications with Dr. P. K. Lee, Westinghouse R & D Center, Pittsburgh, PA.), that the degradation product forms a scavenger-type, phosphorousoxygen network, also possibly acting as a free radical inhibitor during and after its formation. Since impurities in graphite reduce its oxidation resistance, scavenging these impurities significantly increases its thermal stability, thereby reducing its elevated temperature oxidative erosion (i.e., wear rate). More than 2 weight percent of the adjuvant can cause, however, excessive separation/melting where the molten product can severely corrode press platens. No platen corrosion occurs at or below the 2 weight percent (NH$_4$)$_2$HPO$_4$ level;

*The thermal degradative Achilles heel of a carbon-graphite fiber reinforced polymeric composite are the resin/fiber (primary) and resin/additive (secondary) interfaces. Superimposed is the inherently thermally unstable nature of certain low cost Type II fibers, where exposure to temperatures as low as 316° C. (600° F.) can cause crystallographic and/or oxidative changes that lead to composite deformation (i.e., thermal loss of bearing dimensions) even without any relative sliding movement and wear. Therefore, any Type II fiber used for the instant invention must be selected to be crystallographically and thermoxidatively as stable as the cost, application temperature, load, speed and required wear life allow it. The resin/fiber interface degration can be minimized by proper chemical/physical pretreatment of the carbon/graphite fibers for proper wetting by the resin and for the prevention of tribooxidative wear. The (NH$_4$)$_2$HPO$_4$ graphite fiber adjuvant of the instant invention has a tendency of separating out at the fiber/resin interface, providing some protection at the most vulnerable site within the composite. Any additional fiber surface pretreatment, which can enhance the Thermid 600/ carbon-graphite interface tribooxidative stability without degrading friction and wear performance will improve the composites of the instant invention; *Carbon/graphite tows should contain the smallest number of individual fiber strands commercially feasible for self-lubricating preform weaving, where each strand should be coated with a thin resin-varnish, containing very fine (possibly colloidal) forms of the Ga/In/WSe$_2$ compact powder, the (NH$_4$)$_2$HPO$_4$ adjuvant powder or any other advanced additive powder that satisfies the teachings of the instant invention. The preforms woven from such pretreated tows, further impregnated with the resin/additive varnish, will comprise the best prepregs for composite molding; and

*Commercial carbon/graphite weaving technology has achieved a level of development, where planar, cylindrical and other geometrical (3D, 4D, 5D, 7D, etc.) preform preparation can be routinely performed. Based on the teachings of the instant invention, the fiber lay, relative fiber volume (<40 weight percent) of the preform, judicious blending of Type I and Type II fibers within the multidirectional reinforcing skeleton, coupled with the weight percent content of the advanced additives can be varied to result in tailored self-lubricating composites. For example, composites used in self-lubricating retainers of transfer lubricated bearings operating in the oscillatory mode, at small included angles must have relatively high wear rates. Due to the limited number of ball to ball pocket contacts, each such contact must provide the thickest possible lubricative transfer film onto the ball and in turn to the races. Therefore, such composite may be reinforced by no more than 40 weight percent of a multidirectional, cylindrical weave of all or mostly Type I (graphitic, higher wear rates) fibers, containing higher volumes (e.g., 20 to 30 weight percent) of the transfer film formation enhancing solid lubricant additive (i.e., the powdered Ga/In/WSe$_2$ compact). For high load, plain bearing applications e.g., for bushings operating at 316° C. (600° F.) Type II weave reinforcements are required with a minimal amount of additives needed for the friction/wear level desired or tolerated for that application.

Industrial Applicability

Self-lubricating composites prepared in accordance with the teaching of this invention may be used as bushings and as bearing retainers in numerous applications where high load carrying capacities at high temperatures are required. These composites may also be used to fabricate gears, splines, liners of plain bearings and sliding pads for use in moving mechanical assemblies where self-lubrication, under extreme conditions, is required.

Having completely described this invention, and having provided teachings which will enable others to make and use the same, the scope of our claims may now be understood as follows:

What is claimed is:

1. High load capacity, high temperature lubricative composites comprising a multidimensional weave preform, prepared from carbon fibers, graphite fibers or a combination thereof, modified by the addition of an adjuvant consisting essentially of diammonium hydrogen phosphate, and impregnated with a thermally stable high temperature polyimide resin containing lubricative pigments that are oxidatively stable in air up to 1,000° F. wherein said polyimide resin is derived from an acetylene terminated polyimide oligomer whose general structure is

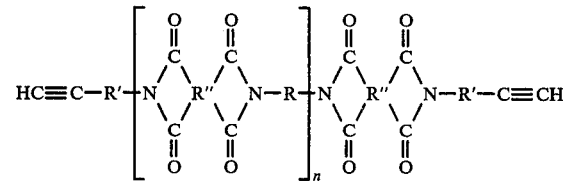

where R'' is phenylene —CO— phenylene, R' is phenylene, R is phenylene oxyphenylene oxyphenylene and n is 1.

2. A composite in accordance with claim 1 wherein said preform is a loosely woven preform having a fiber volume not to exceed 40%, and said pigments are selected from oxidatively stable lamellar solids having a unit cell a/c ratio equal to or greater than 1.95.

3. A lubricative composite of claim 2 wherein said preform is a carbon fiber preform.

4. A composite in accordance with claim 1 wherein said lubricative pigment is a pulverized compact having a particle size distribution of from 5 to 10 micrometers.

5. High temperature, high load capacity lubricative composites comprising multi-directional weave preforms selected from carbon fibers, graphite fibers or a combination thereof, modified by the addition of an adjuvant consisting essentially of diammonium hydrogen phosphate, and impregnated with a thermally stable high temperature polyimide resin containing lubricative pigments of pulverized compacts which are oxidatively stable in air up to 1,000° F. wherein said polyimide resin is derived from an acetylene terminated polyimide oligomer whose general structure is

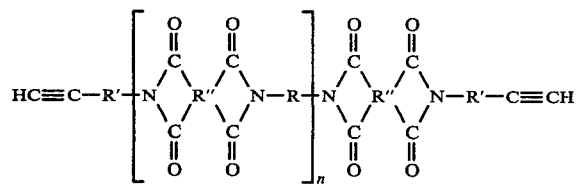

where R″ is phenylene —CO— phenylene, R′ is phenylene, R is phenylene oxyphenylene oxyphenylene and n is 1.

6. A composite of claim 5 wherein said compact is Ga/In/WSe$_2$ and said preform is a carbon fiber preform.

7. The composite of claim 1 in which said adjuvant is present in an amount less than about 2%.

* * * * *

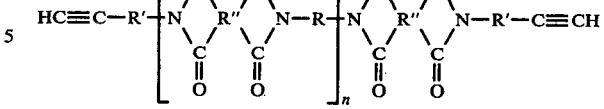

where R″ is phenylene —CO— phenylene, R′ is phenylene, R is phenylene oxyphenylene oxyphenylene and n is 1.

6. A composite of claim 5 wherein said compact is Ga/In/WSe$_2$ and said preform is a carbon fiber preform.

7. The composite of claim 1 in which said adjuvant is present in an amount less than about 2%.

* * * * *